US012798697B2

(12) United States Patent
Lee et al.

(10) Patent No.: US 12,798,697 B2
(45) Date of Patent: Nov. 17, 2026

(54) VEHICULAR VARIABLE SPOILER LIGHTING APPARATUS

(71) Applicant: HYUNDAI MOBIS CO., LTD., Seoul (KR)

(72) Inventors: Soon Mo Lee, Yongin-si (KR); Do Hyung Kim, Yongin-si (KR); Chan Ho Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 286 days.

(21) Appl. No.: 18/613,708

(22) Filed: Mar. 22, 2024

(65) Prior Publication Data

US 2025/0100633 A1 Mar. 27, 2025

(30) Foreign Application Priority Data

Sep. 27, 2023 (KR) ........................ 10-2023-0130409

(51) Int. Cl.
*B62D 35/00* (2006.01)
*B60Q 1/30* (2006.01)

(52) U.S. Cl.
CPC ............. *B62D 35/007* (2013.01); *B60Q 1/30* (2013.01)

(58) Field of Classification Search
CPC ........ B62D 35/007; B62D 37/02; B60Q 1/30; B60Q 1/2661; B60Q 1/2692; B60Q 1/543
USPC .......................................................... 296/180
See application file for complete search history.

(56) References Cited

U.S. PATENT DOCUMENTS

| | | | | |
|---|---|---|---|---|
| 5,119,068 A * | 6/1992 | Nagai | B62D 35/007 362/523 |
| 10,442,344 B2 * | 10/2019 | Stein | H01B 7/0045 |
| 11,691,482 B2 * | 7/2023 | Snider | B60J 1/2008 296/91 |
| 11,835,195 B1 * | 12/2023 | Zhao | F21S 43/14 |
| 2003/0071485 A1 * | 4/2003 | Kazama | B62D 35/007 296/180.1 |
| 2006/0203504 A1 * | 9/2006 | Mori | B62D 35/007 362/541 |
| 2014/0192545 A1 * | 7/2014 | Law | B60Q 1/2607 362/485 |
| 2021/0086846 A1 * | 3/2021 | Duong | B60R 16/0231 |

FOREIGN PATENT DOCUMENTS

| | | | |
|---|---|---|---|
| DE | 102020008127 | * | 2/2022 |
| JP | 2542751 Y | * | 7/1997 |
| JP | 2011251586 | * | 12/2011 |
| KR | 10-2023-0035848 A | | 3/2023 |

* cited by examiner

*Primary Examiner* — Muhammad Shafi
(74) *Attorney, Agent, or Firm* — NSIP Law

(57) ABSTRACT

A light apparatus for a variable spoiler including a rear lamp movably provided in a rear section of a vehicle and configured to protrude to be positioned at multiple steps toward an opposite direction to a forward traveling direction of the vehicle according to a traveling speed of the vehicle and a spoiler movably provided in the rear section, the spoiler being configured to move together with the rear lamp and to be tilted according to the traveling speed of the vehicle.

20 Claims, 9 Drawing Sheets

VEHICULAR VARIABLE SPOILER LIGHTING APPARATUS

CROSS-REFERENCE TO RELATED APPLICATION

This application claims the benefit under 35 USC § 119(a) of Korean Patent Application No. 10-2023-0130409, filed on Sep. 27, 2023, the entire disclosure of which is incorporated herein by reference for all purpose.

BACKGROUND

1. Field

Exemplary embodiments relate to a vehicular variable spoiler lighting apparatus, and more particularly, to a vehicular variable spoiler lighting apparatus being capable of improving aerodynamic performance and providing visual information to a nearby vehicle and a pedestrian.

2. Description of the Related Art

A spoiler may be mounted on a vehicle. The spoiler prevents the vehicle from being lifted from the road surface due to an air vortex phenomenon during high-speed traveling, thereby enhancing the traction of the tires on the road surface. In recent years, variable spoilers that vary in position and direction according to a speed of the vehicle have become available in the market.

Only the tilting angle in the upward-downward direction of a variable spoiler in the related art can be adjusted. Particularly, there also occurs a problem in that the variable spoiler cannot be identified at night from the outside of the vehicle. Therefore, there is a need to address these problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In a general aspect, here is provided a light apparatus for a variable spoiler including a rear lamp movably provided in a rear section of a vehicle and configured to protrude to be positioned at multiple steps toward an opposite direction to a forward traveling direction of the vehicle according to a traveling speed of the vehicle and a spoiler movably provided in the rear section, the spoiler being configured to move together with the rear lamp and to be tilted according to the traveling speed of the vehicle.

The rear section may include a rear body, wherein the rear lamp and the spoiler are movably accommodated in the rear body, a first actuator provided in the rear body and connected to the rear lamp, the first actuator being configured to move the rear lamp in a straight line, and a second actuator provided on the rear lamp and connected to the spoiler, the second actuator being configured to vary a tilting angle of the spoiler.

The spoiler may be seated on the rear lamp.

The apparatus may include a control unit configured to control an operation of each of the first actuator, the second actuator, and the rear lamp.

The rear light may include a lamp housing unit movably accommodated in the rear body and a lamp body movably accommodated in the lamp housing unit, wherein the lamp body includes a light source unit.

The light source unit may be provided on an end portion of the lamp body, the light source unit being configured to protrude from the end portion.

A pattern portion to which a light pattern is emitted may be provided on an outer surface of the light source unit, the light pattern being configured to be visible from an outside of the vehicle whether or not the rear lamp operates.

In a general aspect, here is provided a light apparatus for a vehicular spoiler including a rear lamp provided in a rear section of a vehicle and a spoiler movably provided in the rear section of the vehicle, the spoiler being configured to protrude toward an opposite direction to the a forward traveling direction of the vehicle and to be tilted.

The spoiler may include a first spoiler and second spoilers arranged on both sides, respectively, of the first spoiler.

The rear section may include a rear body, wherein the first spoiler and the second spoiler are movably accommodated in the rear body, a first actuator provided in the rear body, and connected to the first spoiler and the second spoiler, the first actuator being configured to move the first spoiler and the second spoiler in a straight line, and a second actuator provided in the rear body and connected to the first spoiler, the second actuator being configured to vary a tilting angle of the first spoiler.

The apparatus may include a control unit configured to control an operation of each of the first actuator and the second actuator.

The first spoiler may be horizontally provided along the rear body and the second spoilers may be vertically provided along outer edges of the rear body.

The spoiler may be a transparent material.

The rear lamp may be arranged horizontally along a top portion and vertically along outer edges of the rear section.

In a general aspect, here is provided a spoiler apparatus including one or more processors configured to execute instructions and a memory storing the instructions, wherein execution of the instructions configures the one or more processors to control a first operation of a first actuator of a vehicle, the first actuator being configured to move a spoiler of the vehicle in a direction opposite to a travel direction of the vehicle, control a second operation of the a second actuator, the second actuator being configured to tilt the spoiler vertically with respect to the travel direction, and control a third operation of a light source unit, the light source unit being movably provided on a rear section of the vehicle to protrude in the direction opposite to the travel direction.

The controller may be further configured to control a first position of the first actuator and a second position of the second actuator responsive to a travel speed of the vehicle, the first actuator may be controlled to extend the spoiler in the direction opposite to the travel direction responsive to the travel speed and the second actuator may be controlled to tilt the spoiler upward responsive to the travel speed.

The spoiler may be configured to slidably extend from an upper surface of the rear section of the vehicle, and the spoiler may be provided above the light source unit.

The controller may be further configured to control a position of the light source unit responsive to a travel speed of the vehicle and the light source unit may be configured to extend from the rear section of the vehicle responsive to the travel speed.

The spoiler and the light source unit may be configured to move together.

Figure 1:
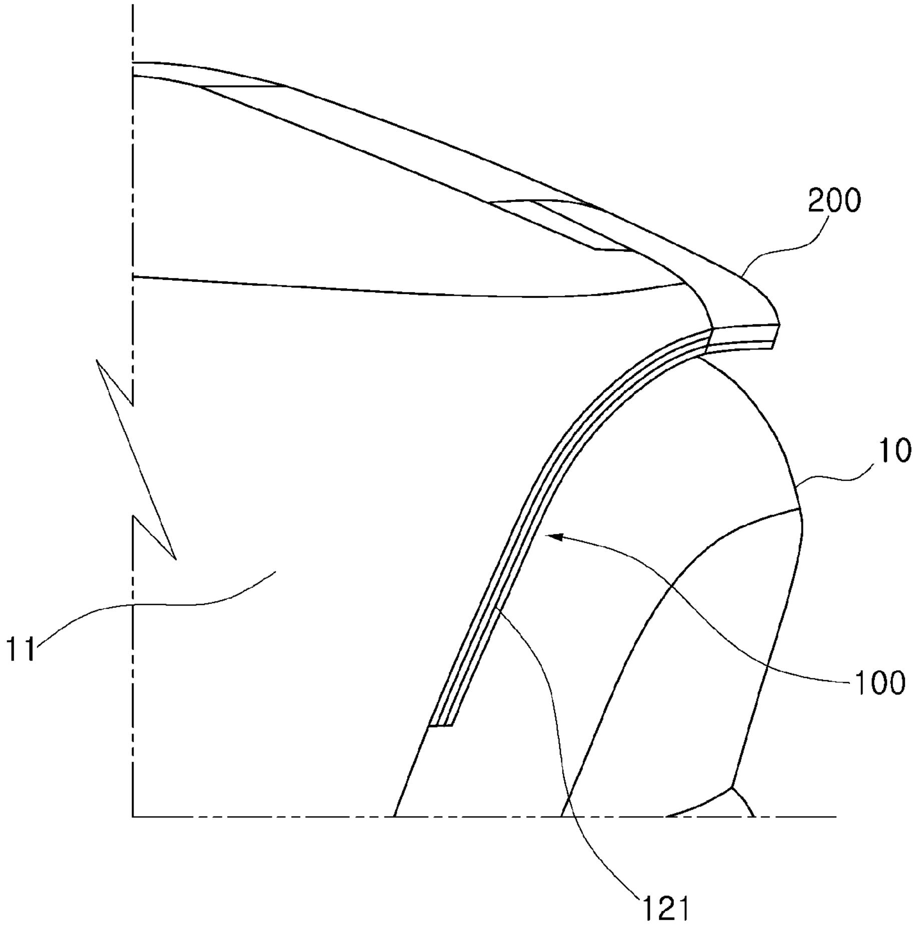
FIG. 1 is a perspective view illustrating a vehicular variable spoiler lighting apparatus according to a first embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

A vehicular variable spoiler lighting apparatus according to the present disclosure will be described below with reference to the accompanying drawings. For clarity and convenience in description, thicknesses of lines, sizes of constituent elements, and the like may be illustrated in a non-exact proportion in the drawings. In addition, terms that hereinafter refer to constituent elements, respectively, according to the present disclosure are defined by considering their respective functions and may vary according to a user's or manager's intention or to practices in the art. Therefore, these terms should be contextually defined in light of the present specification.

Figure 2:
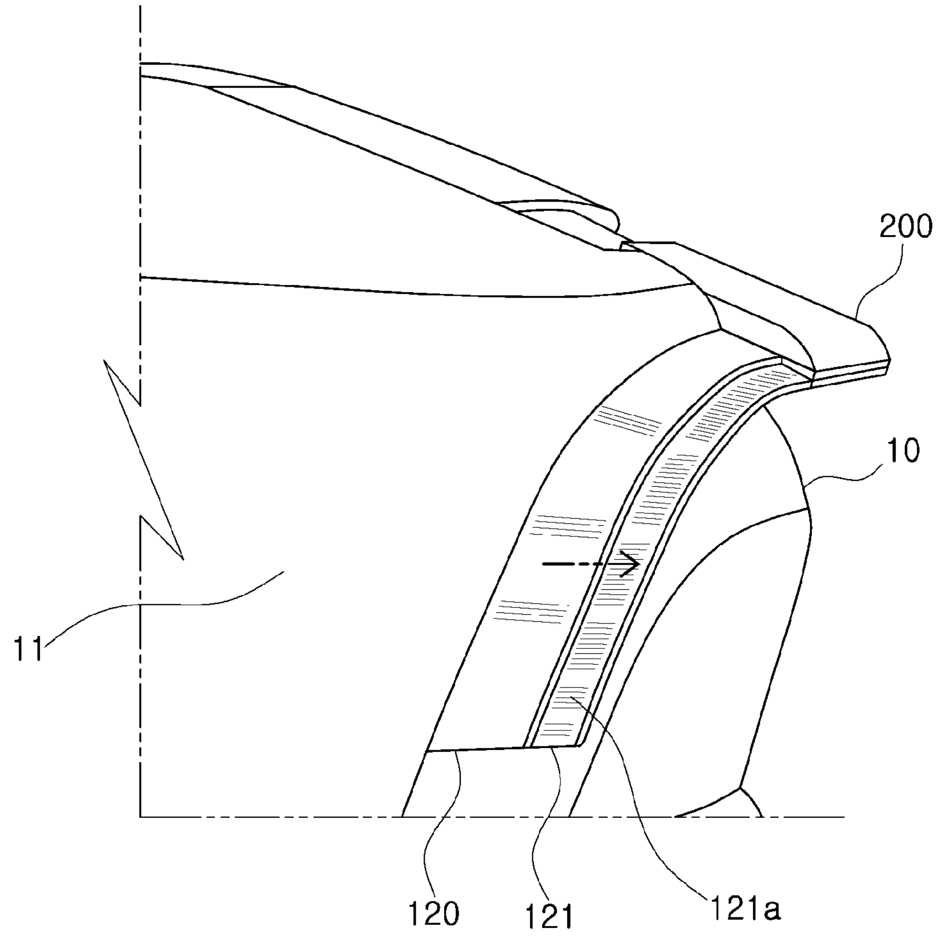
FIG. 2 is a perspective view illustrating a state where a rear lamp of the vehicular variable spoiler lighting apparatus according to the first embodiment of the present disclosure protrudes to be positioned at the first step.
Figure 3:
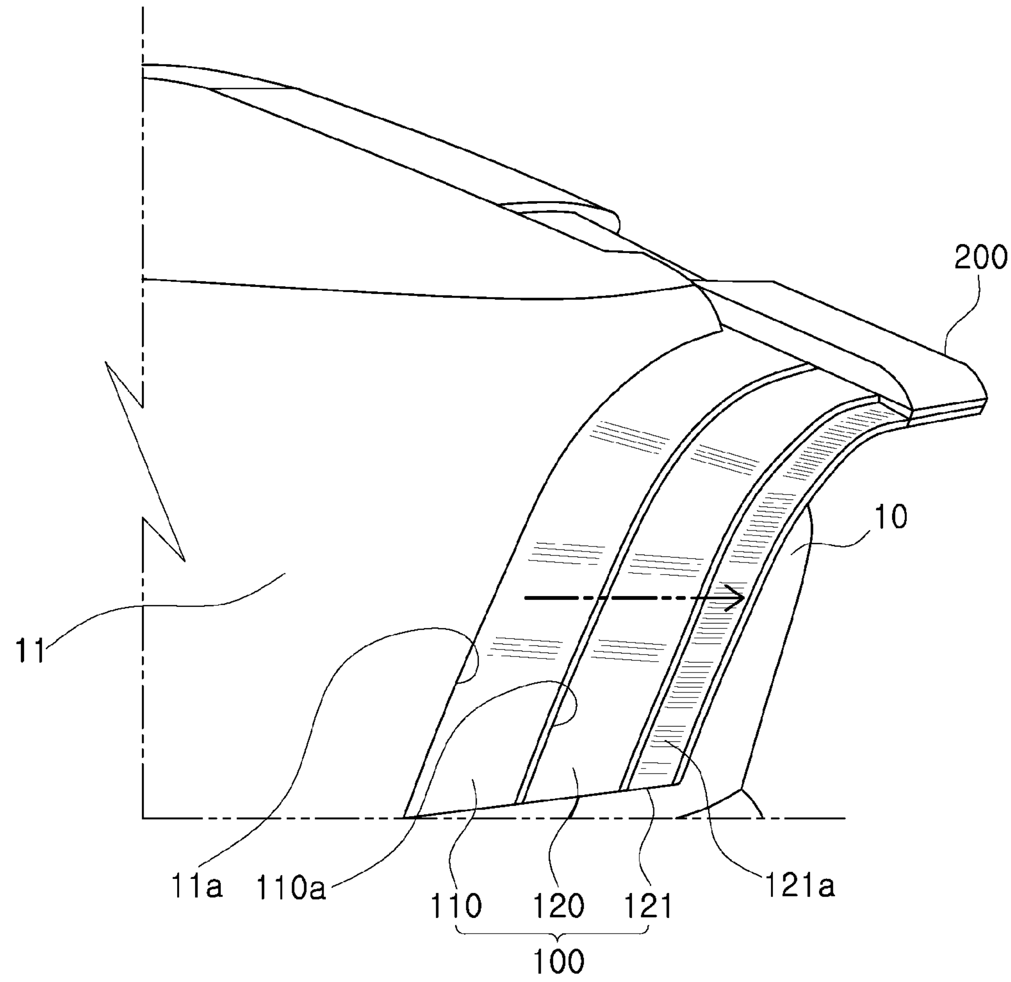
FIG. 3 is a perspective view illustrating a state where the rear lamp of the vehicular variable spoiler lighting apparatus according to the first embodiment of the present disclosure protrudes to be positioned at the second step.
Figure 4:
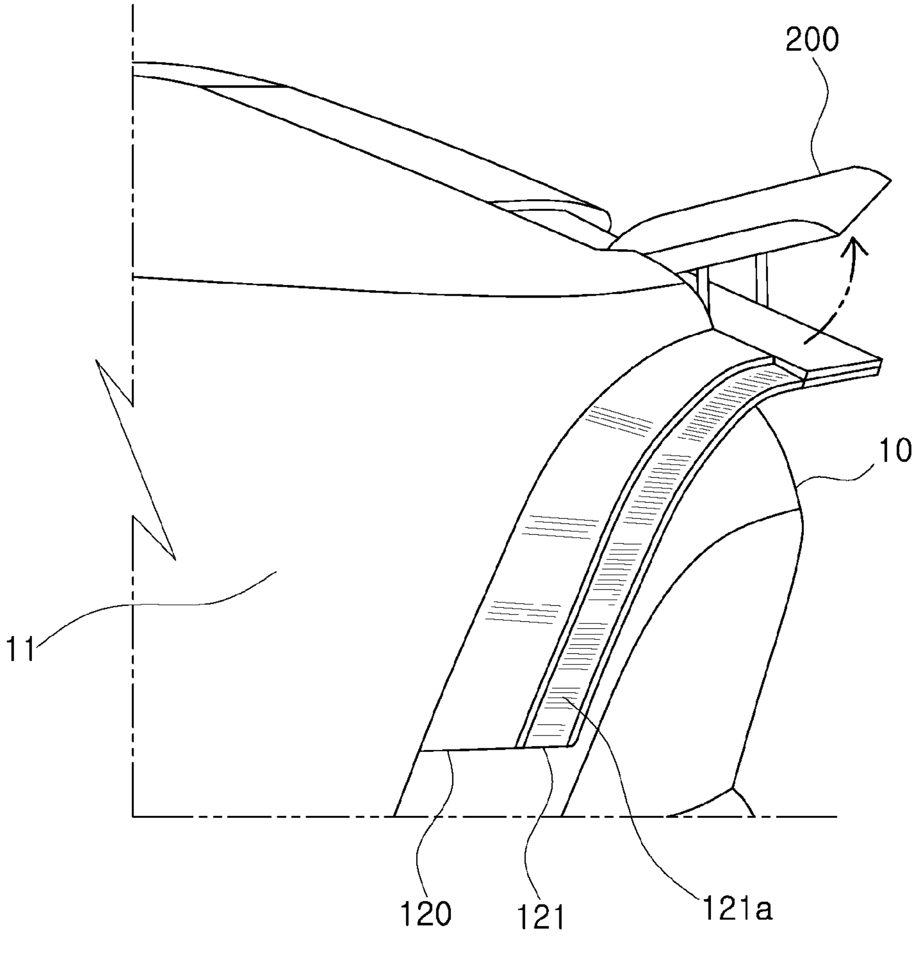
FIG. 4 is a perspective view illustrating a state where a spoiler of the vehicular variable spoiler lighting apparatus according to the first embodiment of the present disclosure is tilted.
Figure 5:
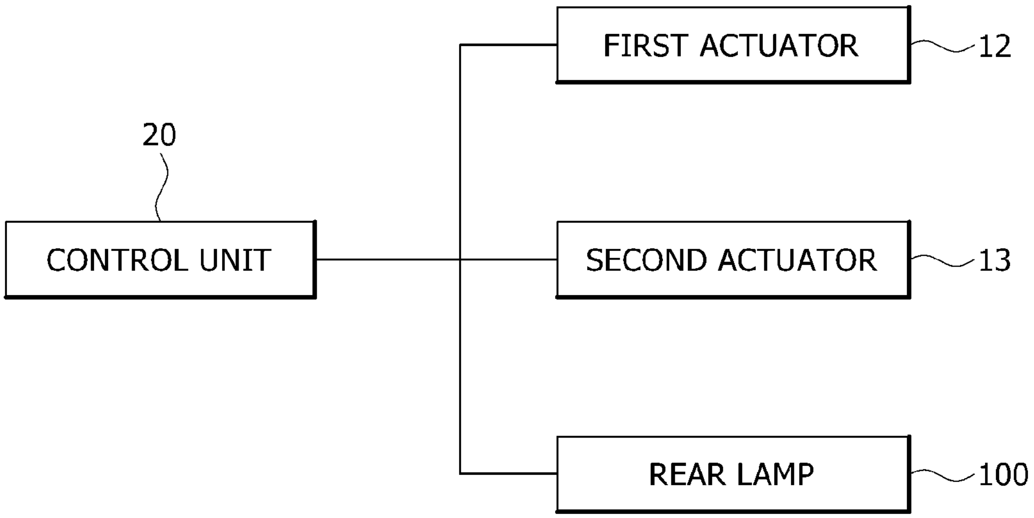
FIG. 5 is a block diagram illustrating a connectional relationship between a control unit of the vehicular variable spoiler lighting apparatus according to the first embodiment of the present disclosure and each of constituent elements thereof.

FIG. 1 is a perspective view illustrating a vehicular variable spoiler lighting apparatus according to a first embodiment of the present disclosure. FIG. 2 is a perspective view illustrating a state where a rear lamp 100 of the vehicular variable spoiler lighting apparatus according to the first embodiment of the present disclosure protrudes to be positioned at the first step. FIG. 3 is a perspective view illustrating a state where the rear lamp 100 of the vehicular variable spoiler lighting apparatus according to the first embodiment of the present disclosure protrudes to be positioned at the second step. FIG. 4 is a perspective view illustrating a state where a spoiler 200 of the vehicular variable spoiler lighting apparatus according to the first embodiment of the present disclosure is tilted. FIG. 5 is a block diagram illustrating a connectional relationship between a control unit of the vehicular variable spoiler lighting apparatus according to the first embodiment of the present disclosure and each of constituent elements thereof.

With reference to FIGS. 1 to 5, the vehicular variable spoiler lighting apparatus according to the first embodiment of the present disclosure includes the rear lamp 100, the spoiler 200, and a control unit 20, which are described in detail as follows.

The rear lamp 100 is movably provided on a rear section 10 of a vehicle. The rear lamp 100 may be arranged in the widthwise direction of the rear section 10.

The rear lamp 100 may emit light toward the opposite direction to the vehicle's forward traveling direction. In other words, light in the shape of a line may be emitted through an edge of the rear lamp 100 that faces toward the opposite direction to the vehicle's forward traveling direction.

The rear lamp 100 may move the forward-backward direction of the vehicle according to a traveling speed of the vehicle and may protrude to be positioned at multiple steps toward the opposite direction to the vehicle's forward traveling direction.

The spoiler 200 is movably provided in the rear section 10. The spoiler 200 may be positioned on top of the rear lamp 100 and may be arranged on the center portion of the rear lamp 100.

The spoiler 200 moves in the forward-backward direction of the vehicle according to the traveling speed of the vehicle, together with the rear lamp 100. The spoiler 200 may move toward the opposite direction to the vehicle's forward traveling direction, together with the rear lamp 100, and then may be tilted in the upward-downward direction according to the traveling speed of the vehicle.

The rear section 10 may include a rear body 11, a first actuator 12, and a second actuator 13.

In the rear body 11 may be accommodated the rear lamp 100 and the spoiler 200. In other words, the rear lamp 100 may be accommodated in the rear body 11. The rear body 11, facing toward the opposite direction to the vehicle's forward traveling direction, may have an opening 11*a* in the outer surface.

The rear lamp 100 may be accommodated in the rear body 11 in a slidably movable manner. Therefore, the rear lamp 100 may be exposed to the outside through the opening 11*a* in the rear body 11.

The spoiler 200 may be accommodated behind the opening 11*a* formed in an upper surface of the rear body 11. The spoiler 200 may be seated on the rear lamp 100.

The first actuator 12 may be provided in the rear body 11. The first actuator 12 may be connected to the rear lamp 100 and may move the rear lamp 100 in a straight line in such a manner as to be positioned at multiple steps.

The second actuator 13 is provided to the rear lamp 100. The second actuator 13 may be connected to the spoiler 200 and may vary a tilting angle, in the upward-downward direction, of the spoiler 200 according to the traveling speed of the vehicle.

The rear lamp 100 may include a lamp housing unit 110 and a lamp body 120.

The lamp housing unit 110 may be accommodated in the rear body 11. In other words, the lamp housing unit 110 may be movably accommodated within the rear body 11.

The lamp housing unit 110 may be accommodated into the rear body 11 in a slidably movable manner. Therefore, the lamp housing unit 110 may be exposed to the outside through the opening 11*a* in the rear body 11.

The spoiler 200 may be seated on the lamp housing unit 110. The spoiler 200 may be rotatably coupled to the lamp housing unit 110.

The lamp body 120 may be accommodated in the lamp housing unit 110. In other words, the lamp body 120 may be movably accommodated into the lamp housing unit 110.

The lamp housing unit 110, facing toward the opposite direction to the vehicle's forward traveling direction, may have an opening 110*a* in the outer surface. Therefore, the lamp body 120 may be exposed to the outside through the opening 110*a* in the lamp housing unit 110.

A light source unit 121 may be provided in the lamp body 120. The light source unit 121 may be provided on an end portion of the lamp body 120, facing toward the opposite direction to the vehicle's forward traveling direction. The light source unit 121 may be provided along an edge of the lamp body 120 in a manner that protrudes toward the opposite direction to the vehicle's forward traveling direction.

The light source unit 121 may have a pattern portion 121*a* in the outer surface. A light pattern is emitted to the pattern portion 121*a*. The pattern portion 121*a* may be formed by performing laser etching processing on an upper surface of the light source unit 121.

When the lamp body 120 is exposed to the outside through the opening 11*a* in the rear body 11, the pattern portion 121*a* can be recognized from the outside, and thus it can be checked from the outside whether or not the rear lamp 100 operates.

The control unit 20 may individually control the operation of the first actuator 12, the operation of the second actuator 13, and the operation of the rear lamp 100. The control unit 20 may control the operation of the first actuator 12, the operation of the second actuator 13, and the operation of the rear lamp 100 according to a traveling mode of the vehicle that automatically varies with a signal generated in a vehicular speed sensor of the vehicle. Furthermore, the control unit 20 may control the operation of the first actuator 12, the operation of the second actuator 13, and the operation of the rear lamp 100 according to the traveling mode of the vehicle that is selected by an occupant's manual operation.

The control unit 20 may be electrically connected to the first actuator 12 and may control the operation of the first actuator 12 in such a manner that the rear lamp 100 moves toward the backward-forward direction of the vehicle.

The control unit 20 may be electrically connected to the second actuator 13 and, by controlling the operation of the second actuator 13, may vary the tilting angle of the spoiler 200 in such a manner that the spoiler 200 is tilted in the upward-downward direction.

The control unit 20 may be electrically connected to the light source unit 121 and may control turning-on and -off operating of the light source unit 121. In other words, the control unit 20 may perform control that turns on or off the light source unit 121, according to the traveling speed of the vehicle.

The process of operation of the vehicular variable spoiler lighting apparatus, configured as described above, according to the first embodiment of the present disclosure is described as follows.

With reference to FIGS. 1 to 5, the control unit 20 may control the operation of the first actuator 12 by inserting the rear lamp 100 into the rear body 11 in such a manner that the rear lamp 100 does not protrude toward the opposite direction to the vehicle's forward traveling direction.

The spoiler 200, moving together with the rear lamp 100, also does not protrude toward the opposite direction to the vehicle's forward traveling direction, and the control unit 20 may control the operation of the second actuator 13 in such a manner that the spoiler 200 has a tilting angle 0 degrees.

At this point, the control unit 20 may perform turning-off control of the light source unit 121 to turn off the light source unit 121 or may perform turning-on control of the light source unit 121 to turn on the light source unit 121.

With reference to FIGS. 2 and 5, when the vehicle travels at a high speed of approximately 100 km/h to approximately 130 km/h, the control unit 20 may control the operation of the first actuator 12 in such a manner that the lamp body 120 inserted within the lamp housing unit 110 is exposed from behind the rear body 11 and protrudes toward the opposite direction to the vehicle's forward traveling direction.

The spoiler 200, moving together with the rear lamp 100, also protrudes toward the opposite direction to the vehicle's forward traveling direction, together with the lamp body 120, and the control unit 20 may control the operation of the second actuator 13 in such a manner that the spoiler 200 continues to maintain its tilting angle of 0 degrees.

The movement of the lamp body 120 can achieve the dual effect of improving aerodynamic and ensuring safe traveling while the vehicle travels at a high speed.

At this point, the control unit 20 may perform the turning-off control of the light source unit 121 to turn off the light source unit 121 or may perform the turning-on control of the light source unit 121 to turn on the light source unit 121.

With reference to FIGS. 3 and 5, when the vehicle travels at a constant speed of approximately 70 km/h or approximately 100 km/h, the control unit 20 may control the operation of the first actuator 12 in such a manner that the lamp housing unit 110 inserted into the rear body 11 is exposed to the outside from behind the rear body 11 and thus protrudes toward the opposite direction to the vehicle's forward traveling direction, together with the lamp housing unit 110 and the lamp body 120.

The spoiler 200, moving together with the rear lamp 100, also protrudes toward the opposite direction to the vehicle's forward traveling direction, together with the lamp housing unit 110 and the lamp body 120, and the control unit 20 may control the operation of the second actuator 13 in such a manner that the spoiler 200 continues to maintain its tilting angle of 0 degrees.

The movements of the lamp housing unit 110 and the lamp body 120 may redirect the flow of a vortex formed behind the vehicle when the vehicle travels at a constant speed, allowing the vehicle to travel a greater distance.

At this point, the control unit 20 may perform the turning-off control of the light source unit 121 to turn off the light source unit 121 or may perform the turning-on control of the light source unit 121 to turn on the light source unit 121.

With reference to FIGS. 4 and 5, when the vehicle travels at a speed of approximately 130 km/h or higher or travels under adverse weather, the control unit 20 may control the operation of the first actuator 12 in such a manner that the lamp body 120 inserted into the lamp housing unit 110 is exposed to the outside from behind rear body 11 and thus protrudes toward the opposite direction to the vehicle's forward traveling direction. Furthermore, the control unit 20 may control the operation of the second actuator 13 in such a manner that the spoiler 200 has a tilting angle of approximately 40 degrees to approximately 90 degrees.

When the vehicle travels at a high speed or under extremely adverse weather, the tilting operation of the spoiler 200 can redirect the flow of air current in the downward direction, thereby enhancing the traction of the tires on the road surface, increasing the stability during forward traveling, and assisting in safe traveling.

At this point, the control unit 20 may perform the turning-off control of the light source unit 121 to turn off the light source unit 121 or may perform the turning-on control of the light source unit 121 to turn on the light source unit 121.

Figure 6:
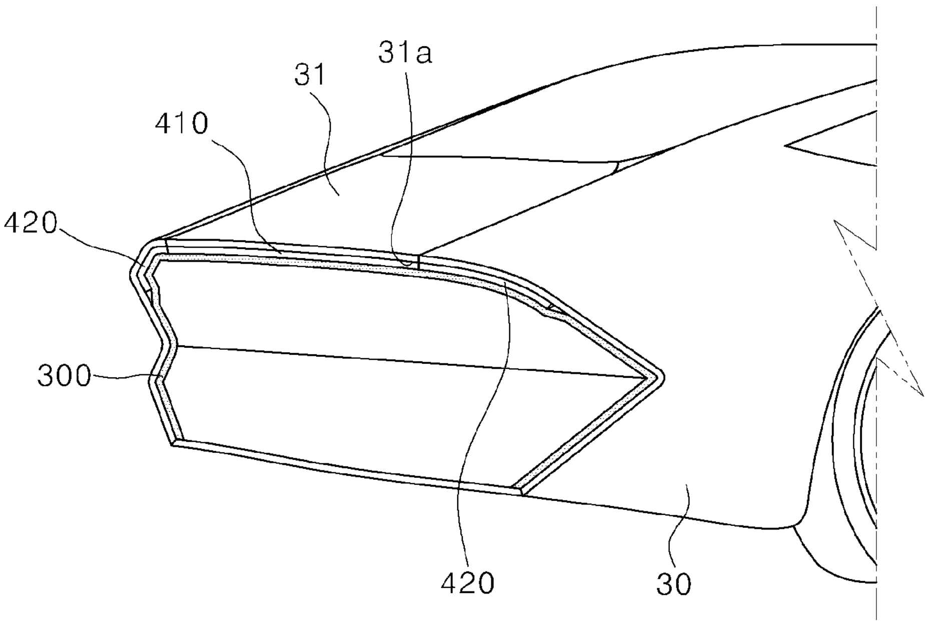
FIG. 6 is a perspective view illustrating a vehicular variable spoiler lighting apparatus according to a second embodiment of the present disclosure.
Figure 7:
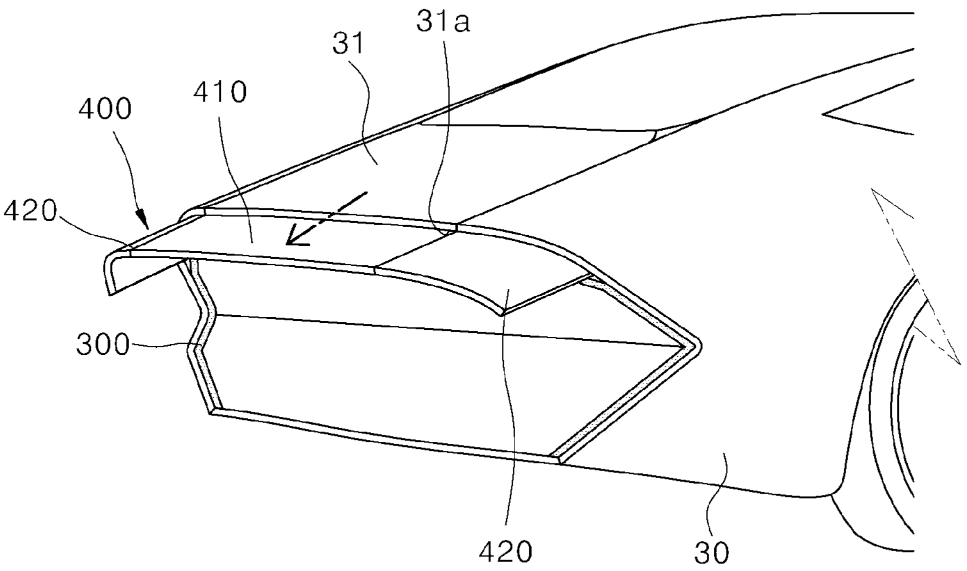
FIG. 7 is a perspective view illustrating a state where a spoiler of the vehicular variable spoiler lighting apparatus according to the second embodiment of the present disclosure protrudes.
Figure 8:
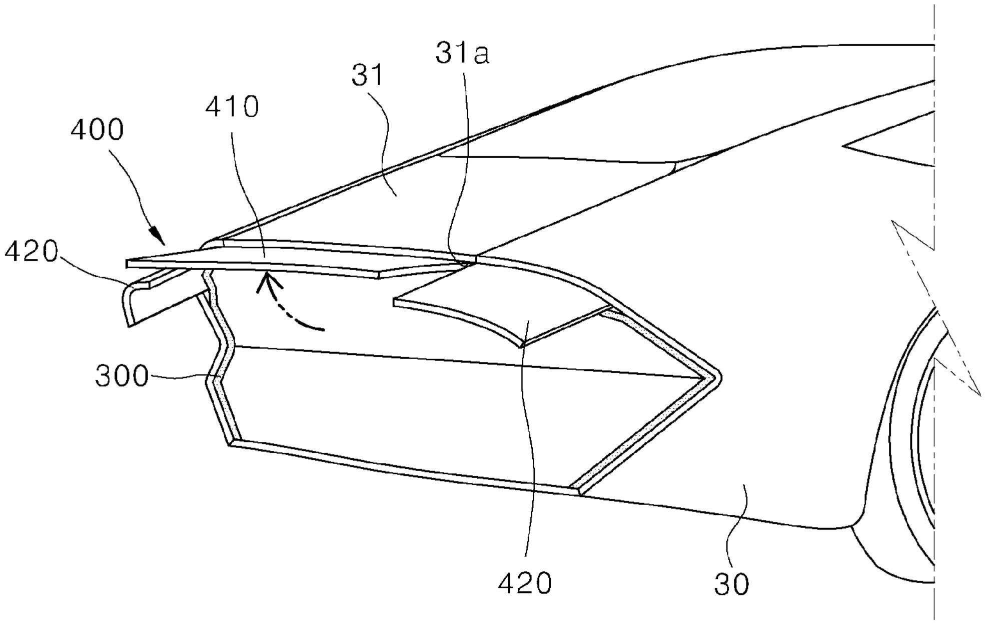
FIG. 8 is a perspective view illustrating a state where a first spoiler of the vehicular variable spoiler lighting apparatus according to the second embodiment of the present disclosure is tilted.
Figure 9:
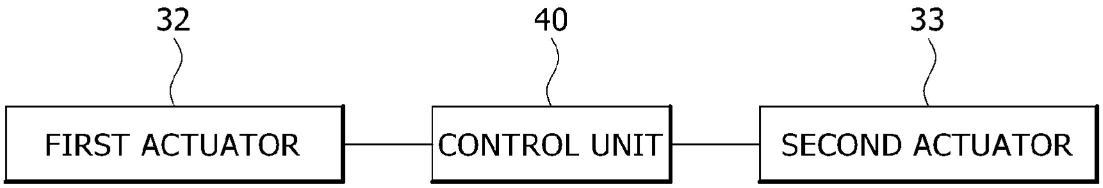
FIG. 9 is a block diagram illustrating a connectional relationship between the control unit of the vehicular variable spoiler lighting apparatus according to the second embodiment of the present disclosure and each of constituent elements thereof.

FIG. 6 is a perspective view illustrating a vehicular variable spoiler lighting apparatus according to a second embodiment of the present disclosure. FIG. 7 is a perspective view illustrating a state where a spoiler 400 of the vehicular variable spoiler lighting apparatus according to the second embodiment of the present disclosure protrudes. FIG. 8 is a perspective view illustrating a state where a first spoiler 410 of the vehicular variable spoiler lighting apparatus according to the second embodiment of the present disclosure is tilted. FIG. 9 is a block diagram illustrating a connectional relationship between a control unit 40 of the vehicular variable spoiler lighting apparatus according to the second embodiment of the present disclosure and each of constituent elements thereof.

With reference to FIGS. 6 to 9, the vehicular variable spoiler lighting apparatus according to the second embodiment includes a rear lamp 300 and the spoiler 400, which are described in detail as follows.

A rear lamp 300 is provided in a rear section 30 of the vehicle. The rear lamp 300 may emit light toward the opposite direction to the vehicle's forward traveling direction. The rear lamp 300 may be arranged along an edge of an outer surface of the rear section 30 that faces toward the opposite direction to the vehicle's forward traveling direction and may emit light in the shape of a line toward the opposite direction to the vehicle's forward traveling direction.

The spoiler 400 is movably provided in the rear section 30. The spoiler 400 may be positioned on top of the rear lamp 300 and may be arranged on the center portion of the rear lamp 300. The spoiler 400 may move in the forward-backward direction of the vehicle. The spoiler 400 may be tilted in the upward-downward direction after moving toward the opposite direction to the vehicle's forward traveling direction.

The spoiler 400 may include the first spoiler 410 and second spoilers 420. The first spoiler 410 may be arranged on the center portion of the rear section 30, and the second spoilers 420 may be arranged on both sides, respectively, of the first spoiler 410.

The rear section 30 may include a rear body 31, a first actuator 32, and a second actuator 33.

In the rear body 31 may be accommodated the spoiler 400. In other words, the spoiler 400 may be accommodated within the rear body 31. The rear body 31, facing toward the opposite direction to the vehicle's forward traveling direction, may have an opening 31*a* in the outer surface.

The first spoiler 410 and the second spoiler 420 may be accommodated in the rear body 31 in a slidably movable manner. Therefore, the first spoiler 410 and the second spoiler 420 may be exposed to the outside through an opening 31*a* in the rear body 31.

The first actuator 32 may be provided in the rear body 31. The first actuator 32 may be connected to the first spoiler 410 and the second spoiler 420 and thus may move the first spoiler 410 and the second spoiler 420 in a straight line.

The second actuator 33 may be provided in the rear body 31. The second actuator 33 may be connected to the first spoiler 410 and thus may vary a tilting angle, in the upward-downward direction, of the first spoiler 410.

The control unit 40 may individually control the operation of the first actuator 32 and the operation of the second actuator 33. The control unit 40 may control the operation of the first actuator 32 and the operation of the second actuator 33 according to the traveling mode of the vehicle that automatically varies with a signal generated in the vehicular speed sensor of the vehicle. Furthermore, the control unit 40 may control the operation of the first actuator 32 and the operation of the second actuator 33 according to the traveling mode of the vehicle that is selected by the occupant's manual operation.

The control unit 40 may be electrically connected to the first actuator 32 and may control the operation of the first actuator 32 in such a manner that the first spoiler 410 and the second spoiler 420 move in the forward-backward direction of the vehicle.

The control unit 40 may be electrically connected to the second actuator 33 and may vary the tilting angle of the first spoiler 410 by controlling the operation of the second actuator 33 in such a manner that the first spoiler 410 is tilted in the upward-downward direction.

The process of operation of the vehicular variable spoiler lighting apparatus, configured as described above, according to the second embodiment of the present disclosure is described as follows.

With reference to FIGS. 6 and 9, as an implementation example, when the vehicle travels below a first preset speed, the control unit 40 may control the operation of the first actuator 32 in such a manner that the first spoiler 410 and the second spoiler 420 are inserted into the rear body 31 and that the first spoiler 410 and the second spoiler 420 thus do not protrude toward the opposite direction to the vehicle's forward traveling direction.

As another implementation example, with a control signal that is generated in an ECU of the vehicle according to the traveling mode of the vehicle that is selected by the occupant's manual operation, the control unit 40 may control the operation of the first actuator 32 in such a manner that the first spoiler 410 and the second spoiler 420, which are accommodated within the rear body 31, do not protrude toward the opposite direction to the vehicle's forward traveling direction.

With reference to FIGS. 7 and 9, as an implementation example, when the vehicle travels above the first preset speed, but below a second present speed, the control unit 40 may control the operation of the first actuator 32 in such a manner that the first spoiler 410 and the second spoiler 420, which are inserted into the rear body 31, are exposed to the outside from behind the rear body 31 and thus protrude toward the opposite direction to the vehicle's forward traveling direction.

As another implementation example, with a control signal that is generated in the ECU of the vehicle according to the traveling mode of the vehicle that is selected by the occupant's manual operation, the control unit 40 may control the operation of the first actuator 32 in such a manner that the first spoiler 410 and the second spoiler 420, which are accommodated within the rear body 31, are exposed to the outside from behind the rear body 31 and thus protrude toward the opposite direction to the vehicle's forward traveling direction.

The movements of the first spoiler 410 and the second spoiler 420 can redirect the flow of air current formed behind the vehicle when the vehicle travels, allowing the vehicle to travel a greater distance.

With reference to FIGS. 8 and 9, as an implementation example, when the vehicle travels at or above the second preset speed or travels under adverse weather, the control unit 40 may control the operation of the second actuator 33 in such a manner that the first spoiler 410 has a tilting angle of greater than approximately 0 degrees.

As another implementation example, with a control signal that is generated in the ECU of the vehicle according to the traveling mode of the vehicle that is selected by the occupant's manual operation, the control unit 40 may control the operation of the second actuator 33 in such a manner that the first spoiler 410 has a tilting angle in the upward-downward direction of greater than approximately 0 degrees.

When the vehicle travels at a high speed or under extremely adverse weather, the tilting operation of the first spoiler 410 can redirect the flow of air current in the downward direction, thereby enhancing the traction of the tires on the road surface, increasing the stability during forward traveling, and assisting in safe traveling.

Figure 10:
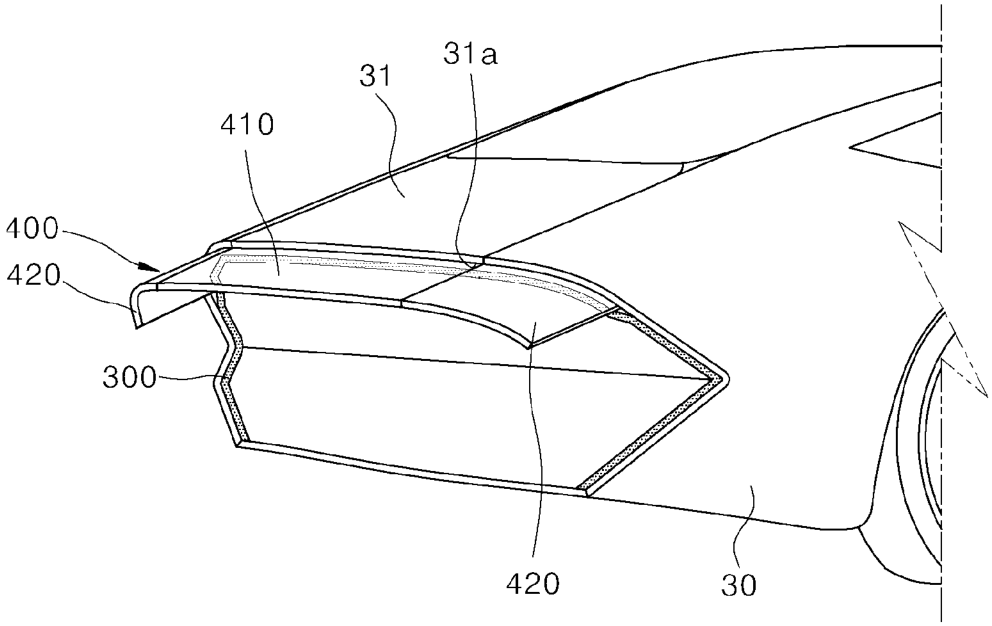
FIG. 10 is a perspective view illustrating a state where a spoiler of a vehicular variable spoiler lighting apparatus according to a third embodiment of the present disclosure protrudes.

FIG. 10 is a perspective view illustrating a state where the spoiler 400 of the vehicular variable spoiler lighting apparatus according to a third embodiment of the present disclosure protrudes.

With reference to FIG. 10, the vehicular variable spoiler lighting apparatus according to the third embodiment of the present disclosure may include the rear lamp 300 and the spoiler 400.

Another implementation example of the spoiler 400 of the vehicular variable spoiler lighting apparatus according to the second or third embodiment of the present disclosure, which is a spoiler of the vehicular variable spoiler lighting apparatus according to the third embodiment of the present disclosure, is described.

The descriptions of the constituent elements of the vehicular variable spoiler lighting apparatus according to the second embodiment of the present disclosure may apply to the constituent elements of the vehicular variable spoiler lighting apparatus according to the second embodiment of the present disclosure except for the spoiler 400.

The spoiler 400 may be formed of transparent material. Light emitted by the rear lamp 300 provided in the rear section 30 of the vehicle may pass through the spoiler 400, which protrudes toward the opposite direction to the vehicle's forward traveling direction, and then may scatter. The transparent spoiler 400 may serve to refract light to focus or disperse the light.

The light emitted by the rear lamp 300 can create a lighting effect through the spoiler 400 protruding toward the opposite direction to the vehicle's forward traveling direction. This light effect can provide visual information to a driver of another vehicle or a pedestrian.

In the vehicular variable spoiler lighting apparatuses according of the first, second, and third embodiments of the present disclosure, according to the traveling speed of the vehicle, the rear lamp 100 protrudes to be positioned at multiple steps toward the opposite direction to the vehicle's forward traveling direction. Furthermore, the spoiler 200 protrudes toward the opposite direction to the vehicle's forward traveling direction, together with the rear lamp 100 and has a tilting angle in the opposite direction to the vehicle's forward traveling direction that varies according to the traveling speed. In this manner, the rear lamp 100 and the spoiler 200 can minimize air resistance occurring behind the vehicle, thereby increasing a distance that the vehicle can travel.

In the vehicular variable spoiler lighting apparatuses according to the first, second, and third embodiments of the present disclosure, the rear lamp 100, moving in the forward-backward direction of the vehicle according to the traveling speed of the vehicle, can provide visual information to a driver of another vehicle to a pedestrian.

In the vehicular variable spoiler lighting apparatuses according to the embodiments of the present disclosure, the first spoiler 410 and the second spoiler 420, which protrude toward the opposite direction to the vehicle's forward traveling direction, can minimize the air resistance occurring behind the vehicle. Furthermore, the first spoiler 410 that varies in tilting angle in the upward-downward direction, can generate downforce during high-speed traveling, thereby assisting in safe traveling.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A light apparatus for a variable spoiler, comprising:

a rear lamp movably provided in a rear section of a vehicle and configured to protrude to be positioned at multiple steps toward an opposite direction to a forward traveling direction of the vehicle according to a traveling speed of the vehicle; and a spoiler movably provided in the rear section, the spoiler being configured to move together with the rear lamp and to be tilted according to the traveling speed of the vehicle.

2. The apparatus of claim 1, wherein the rear section comprises:

a rear body, wherein the rear lamp and the spoiler are movably accommodated in the rear body;

a first actuator provided in the rear body and connected to the rear lamp, the first actuator being configured to move the rear lamp in a straight line; and a second actuator provided on the rear lamp and connected to the spoiler, the second actuator being configured to vary a tilting angle of the spoiler.

3. The apparatus of claim 2, wherein the spoiler is seated on the rear lamp.

4. The apparatus of claim 2, further comprising:

a control unit configured to control an operation of each of the first actuator, the second actuator, and the rear lamp.

5. The apparatus of claim 4, wherein the control unit is further configured to control turning-on and turning-off of the light source unit according to the traveling speed of the vehicle.

6. The apparatus of claim 2, wherein the rear lamp comprises:

a lamp housing unit movably accommodated in the rear body; and a lamp body movably accommodated in the lamp housing unit, wherein the lamp body comprises a light source unit.

7. The apparatus of claim 6, wherein the light source unit is provided on an end portion of the lamp body, the light source unit being configured to protrude from the end portion.

8. The apparatus of claim 7, wherein a pattern portion to which a light pattern is emitted is provided on an outer surface of the light source unit, the light pattern being configured to be visible from an outside of the vehicle whether or not the rear lamp operates.

9. A light apparatus for a vehicular spoiler, comprising:

a rear lamp provided in a rear section of a vehicle; and a spoiler movably provided in the rear section of the vehicle, the spoiler being configured to protrude toward an opposite direction to the forward traveling direction of the vehicle and to be tilted.

10. The apparatus of claim 9, wherein the spoiler comprises:

a first spoiler; and second spoilers arranged on both sides, respectively, of the first spoiler.

11. The apparatus of claim 10, wherein the rear section comprises:

a rear body, wherein the first spoiler and the second spoiler are movably accommodated in the rear body;

a first actuator provided in the rear body, and connected to the first spoiler and the second spoiler, the first actuator being configured to move the first spoiler and the second spoiler in a straight line; and a second actuator provided in the rear body and connected to the first spoiler, the second actuator being configured to vary a tilting angle of the first spoiler.

12. The apparatus of claim 11, further comprising:

a control unit configured to control an operation of each of the first actuator and the second actuator.

13. The apparatus of claim 11, wherein the first spoiler is horizontally provided along the rear body, and wherein the second spoilers are vertically provided along outer edges of the rear body.

14. The apparatus of claim 9, wherein the spoiler comprises a transparent material.

15. The apparatus of claim 9, wherein the rear lamp is arranged horizontally along a top portion and vertically along outer edges of the rear section.

16. A spoiler apparatus, comprising:

one or more processors configured to execute instructions; and a memory storing the instructions, wherein execution of the instructions configures the one or more processors to:

control a first operation of a first actuator of a vehicle, the first actuator being configured to move a spoiler of the vehicle in a direction opposite to a travel direction of the vehicle;

control a second operation of a second actuator, the second actuator being configured to tilt the spoiler vertically with respect to the travel direction; and control a third operation of a light source unit, the light source unit being movably provided on a rear section of the vehicle to protrude in the direction opposite to the travel direction.

17. The apparatus of claim 16, wherein the controller is further configured to:

control a first position of the first actuator and a second position of the second actuator responsive to a travel speed of the vehicle, wherein the first actuator is controlled to extend the spoiler in the direction opposite to the travel direction responsive to the travel speed, and wherein the second actuator is controlled to tilt the spoiler upward responsive to the travel speed.

18. The apparatus of claim 16, wherein the spoiler is configured to slidably extend from an upper surface of the rear section of the vehicle, and wherein the spoiler is provided above the light source unit.

19. The apparatus of claim 16, wherein the controller is further configured to:

control a position of the light source unit responsive to a travel speed of the vehicle, wherein the light source unit is configured to extend from the rear section of the vehicle responsive to the travel speed.

20. The apparatus of claim 19, wherein the spoiler and the light source unit are configured to move together.

* * * * *